(12) United States Patent
Hong

(10) Patent No.: US 8,762,874 B2
(45) Date of Patent: Jun. 24, 2014

(54) METHOD OF QUANTITATIVE ANALYSIS

(76) Inventor: Patrick Pei-Jan Hong, Irvine, CA (US)

( * ) Notice: Subject to any disclaimer, the term of this patent is extended or adjusted under 35 U.S.C. 154(b) by 310 days.

(21) Appl. No.: 13/276,291

(22) Filed: Oct. 18, 2011

(65) Prior Publication Data

US 2012/0096382 A1    Apr. 19, 2012

Related U.S. Application Data

(60) Provisional application No. 61/394,750, filed on Oct. 19, 2010.

(51) Int. Cl.
*G06F 3/048* (2013.01)
*G06F 17/30* (2006.01)
*G06F 9/44* (2006.01)
*G06F 3/0481* (2013.01)

(52) U.S. Cl.
CPC .............. *G06F 8/34* (2013.01); *G06F 3/0481* (2013.01); *G06F 17/30864* (2013.01)
USPC ............ 715/771; 715/762; 715/764; 707/736

(58) Field of Classification Search
CPC .... G06F 8/34; G06F 3/0481; G06F 17/30864
USPC .......................... 715/762–764, 771; 707/736
See application file for complete search history.

(56) References Cited

U.S. PATENT DOCUMENTS

| | | | |
|---|---|---|---|
| 6,839,681 B1 * | 1/2005 | Hotz | 705/14.41 |
| 8,214,238 B1 * | 7/2012 | Fairfield et al. | 705/7.11 |
| 2008/0189632 A1 * | 8/2008 | Tien et al. | 715/764 |
| 2009/0161938 A1 * | 6/2009 | Shekhar et al. | 382/131 |
| 2010/0023531 A1 * | 1/2010 | Brisebois et al. | 707/10 |
| 2011/0208565 A1 * | 8/2011 | Ross et al. | 705/7.38 |

* cited by examiner

*Primary Examiner* — Tadeese Hailu
(74) *Attorney, Agent, or Firm* — Timothy Dennison

(57) ABSTRACT

A system and method for the identification, analysis, attribution, and graphical display pertaining to the effectiveness of public relations is described. The methodology is based on a massively quantitative approach suitable for numerical processing. This method provides a computer-based means of consolidating both internal and external data and producing a graphical representation of the quantitative results to attribute individual contributions of separate data sources.

14 Claims, 6 Drawing Sheets

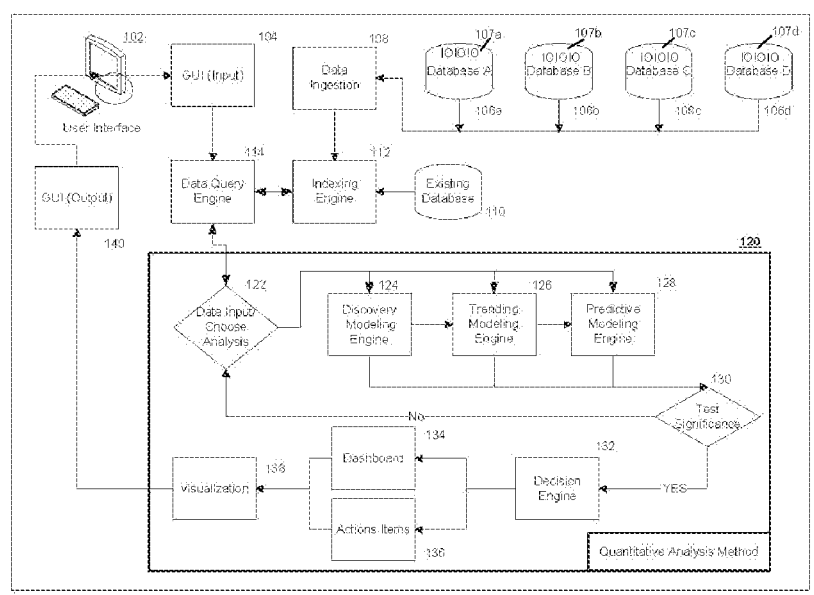

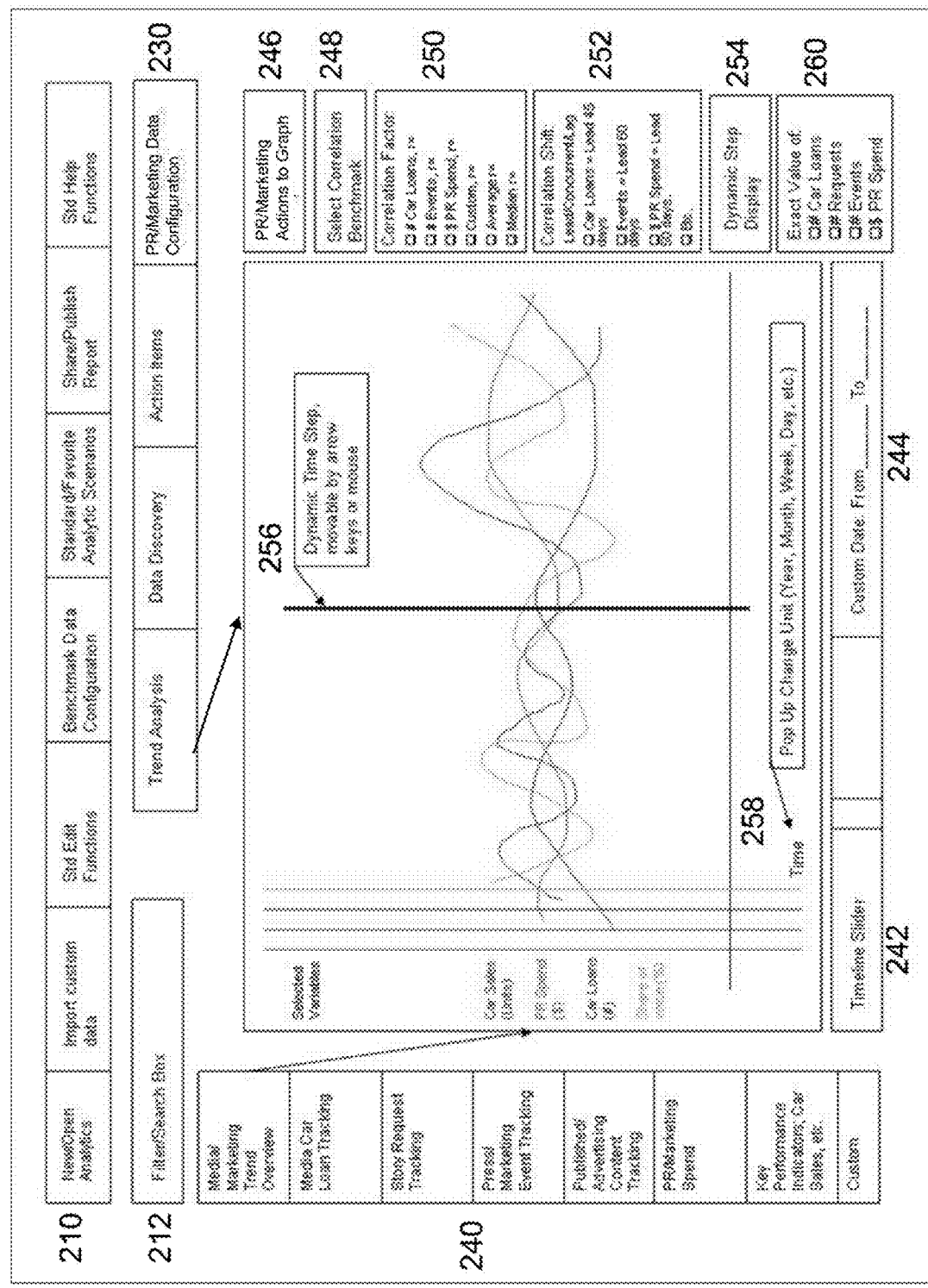
FIG. 2: Software Graphical User Interface

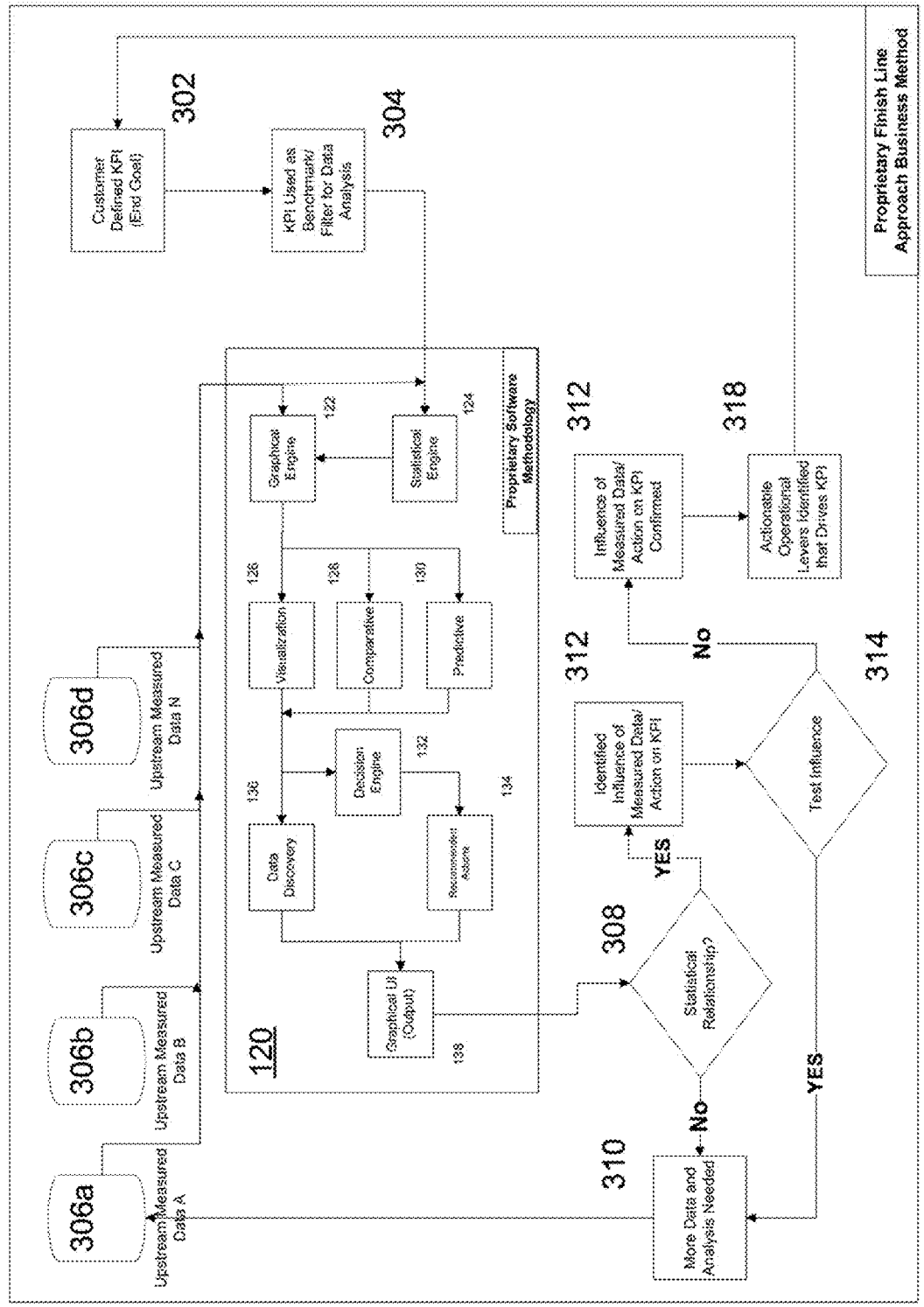
FIG. 3: Finish Line Approach Flowchart

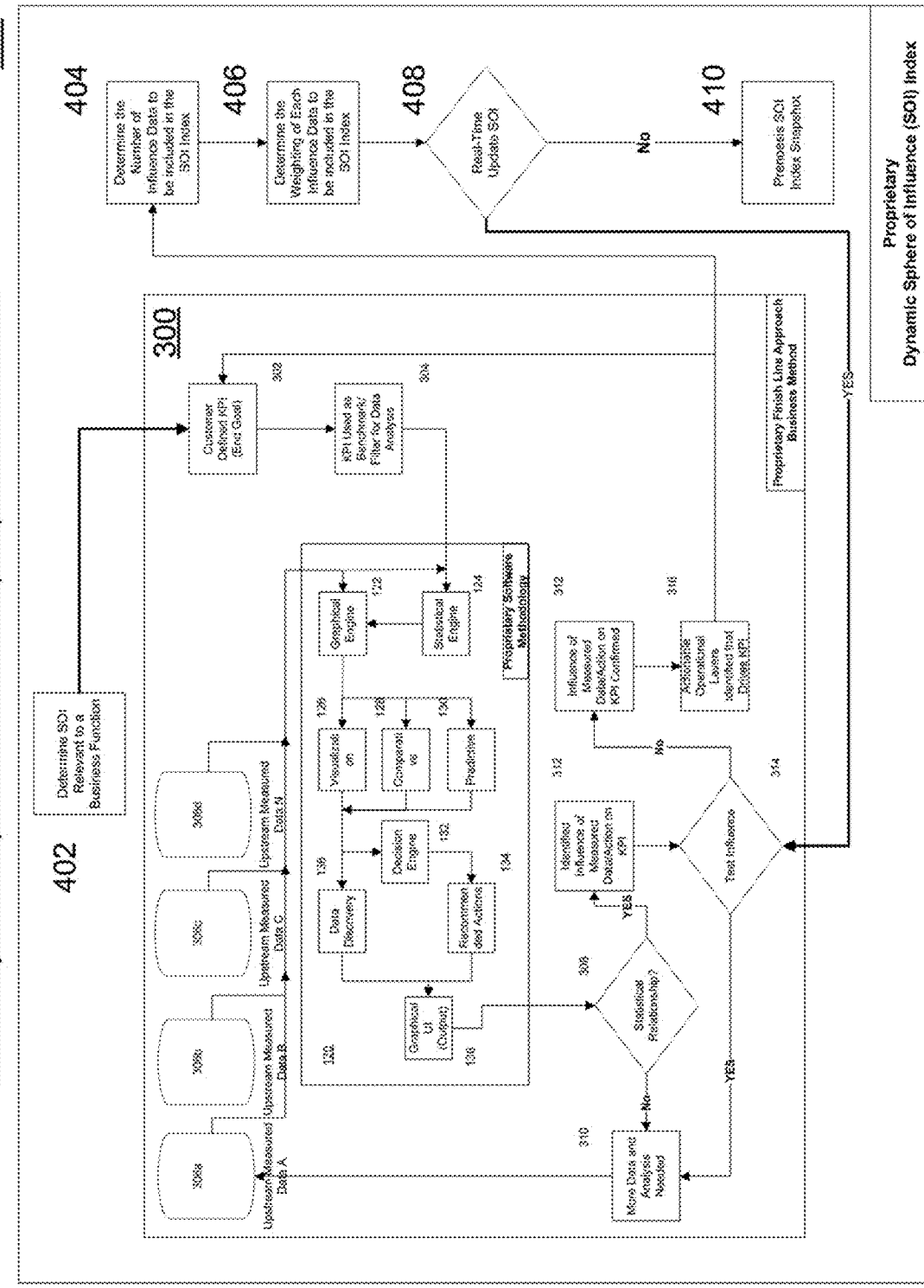
FIG. 4: Dynamic Sphere of Influence (SOI) Index Flowchart

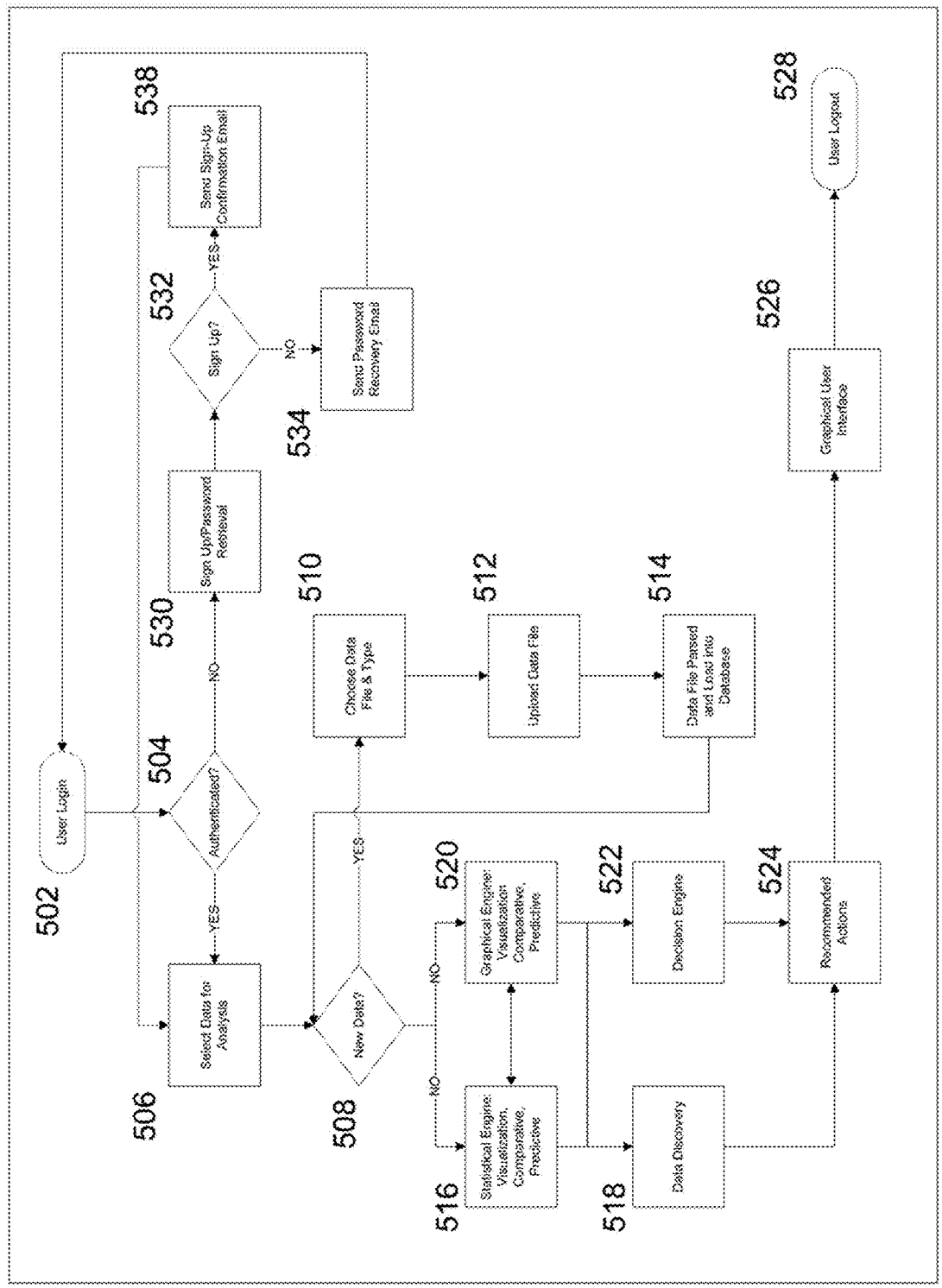
FIG. 5: Software User Execution Flowchart

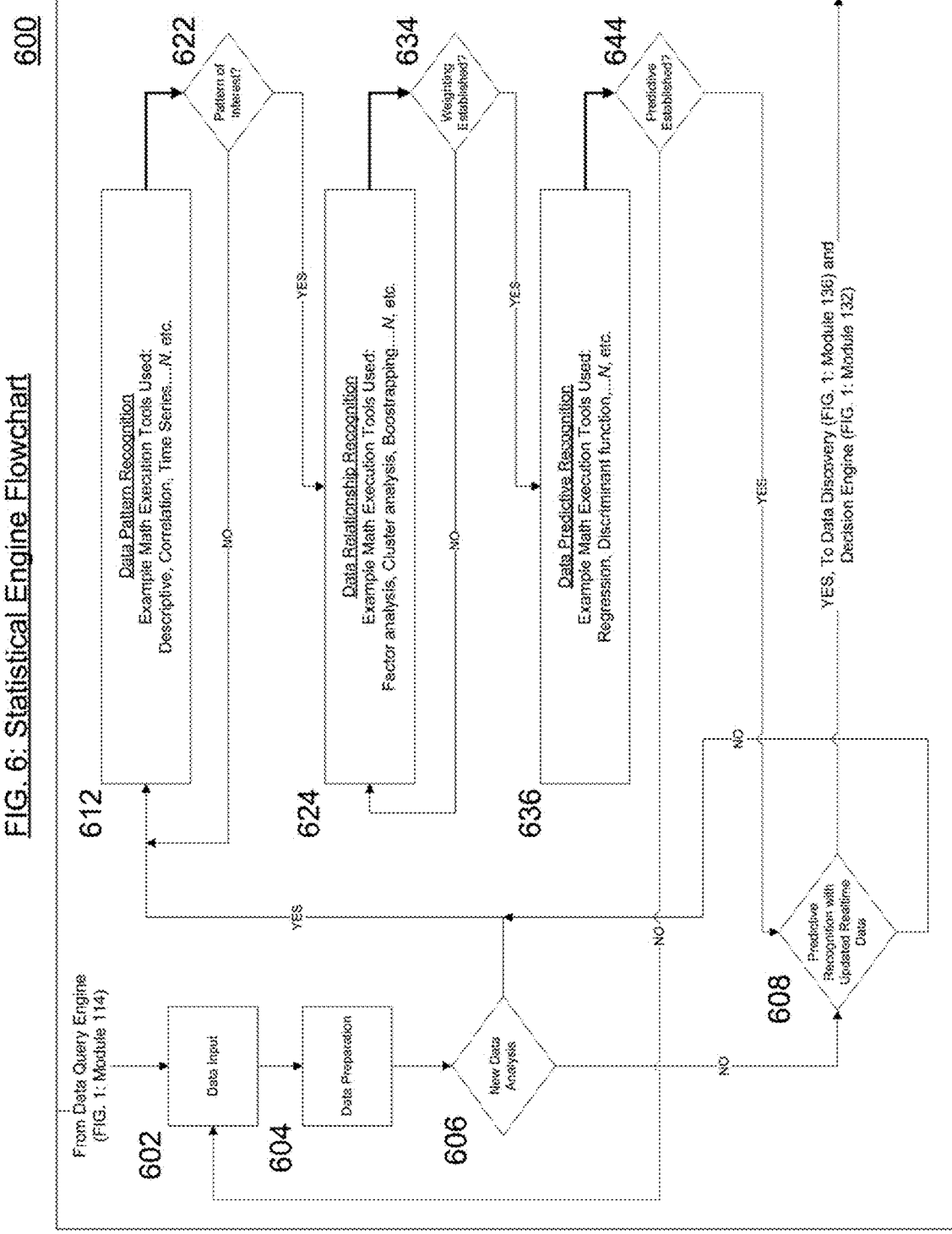
FIG. 6: Statistical Engine Flowchart

METHOD OF QUANTITATIVE ANALYSIS

BACKGROUND

The invention pertains to the attribution to and effectiveness of single known data points and their effect on other single, but unknown data points, in a massive secondary, tertiary or higher linked system. One example of this is the attribution to and effectiveness of public relations or other marketing events on revenue. It is commonly accepted that public reputation and consumer awareness are key drivers of corporate revenue and brand value. However, the effects of particular public relation or marketing events on the reputation or public awareness of a firm or product is difficult to attribute quantitatively.

Traditionally, public relations and marketing professionals analyze paper or electronic sources to determine what effect, if any, their efforts to drive company reputation and consumer awareness through the media can have any measurable effect. And any subsequent measured effects deduced have been limited to a narrow set of metrics such as share-of-voice, number of impressions, etc. No further conclusions have been made to quantitatively link these already limited set of metrics and its effect on sales or revenue—the ultimate measure of corporate health.

Whereas earlier ages were hampered by the lack of paper sources, current analysts may be overwhelmed by the amount of data that are electronically available through search engines or third-party aggregated press databases. This information overload has made it harder, rather than easier to determine the cause and effect of public relations and marketing efforts and the effect of reputation and consumer awareness campaigns have in driving corporate revenue. Further, current methods of measuring PR and marketing performance have been limited to efficiencies on a per-impression acquisition or per-campaign basis. For example, cost per impression or cost per click through various media channels. A company with a far larger market share (or indeed PR and advertising budget) will naturally have wider media exposure than a smaller competitor, yet this in itself does not quantitatively indicate how effectively the available resources to impart consumer awareness in the media are being utilized as contributor to corporate revenue. There is a need, fulfilled by this invention, to resolve this massive data dump into coherent, graphical results.

SUMMARY OF THE INVENTION

It is an object of the present invention to provide a method to use statistical modeling to establish discovery, trending and predictive relationships between any data sets.

It is an object of the present invention to provide a method of performance measurement for public relations and marketing events.

It is an object of the present invention to provide a method for consolidating information regarding events for evaluation of corporate key performance relevance from public relations and marketing events.

It is an object of the present invention to provide a method to integrate and compare on an equivalent basis the effectiveness of a variety of public relations events and marketing levers.

It is a further object of the present invention to provide a method of evaluating multiple external events to determine their public relations and marketing efforts with revenue significance.

It is a further object of the present invention to provide a relationship between data sets working from a finish-to-start methodology (Finish Line Approach) to determine the relationship.

It is a further object of the present invention to provide a scalable, Software-as-a-Service (SaaS) solution that uses statistical modeling to establish relationships between any data. The system has the ability to digest any data, establish a mathematic relationship between the data, and identify the actions that the data was measured against to show which has the most quantitative impact on business, and finally, use this information to build a predictive model.

It is a further object of the present invention to provide this information dynamically in real-time.

Thus according to the principles of the invention, there is provided a method of doing business and a system for gathering a plurality of external promotional events having significance to a customer, indexing the external events for an electronic database and abstracting predefined portions thereof for inclusion in the database, evaluating the influence of each of the external references to the defined customer and generating at least one report summarizing the influence or return that each of the external events has on revenue.

The following describes an exemplary data set from the automotive industry that may be utilized in the present invention. The data set may include, without limitation: (i) media car loans, (ii) story requests, (iii) press/marketing events, (iv) published/advertising content, (v) PR/marketing spend, (vi) key performance indicators such as car sales, and (vii) a custom field. These options may then be combined and packaged to provide a graphical result.

The exemplary data set headers are defined as:

Media Car Loans: Car manufacturers provide automobiles to the media for test drives and pre-release evaluation.

Story Requests: Media queries to car manufactures regarding interest to publish stories.

Press/Marketing Events: Media or consumer invited to events sponsored by car manufacturers for new product introduction and tests.

Published/Advertising Content: Media coverage or advertising on TV, in magazines, on Internet, or in any other emerging media such as social networks.

PR/Marketing Spend: The cost associated with PR and marketing levers.

Key Performance Indicators (KPI): Important metrics describing the ultimate company goals determined and selected by the software user. Examples: car sales, unit sales, etc.

Custom: Placeholder for one or more Key Performance Indicators (KPI) such as share-of-voice, conquests buys, brand awareness or reputation measures common to PR and Further features and advantages of the invention as well as the structure and operation of the preferred embodiments of the present invention are described in detail below with reference to the accompanying drawings. In the drawings, like numbers indicate identical or functionally similar elements.

BRIEF DESCRIPTION OF THE DRAWINGS

Preferred embodiments of the present invention will now be described, by way of example only, with reference to the accompanying drawings in which:

FIG. 1 is an exemplary block diagram that depicts the structure of the system embodying the present invention.

FIG. 2 is a graphical representation showing the detail of the flow of information in the Modeling Engine operation.

FIG. 3 is an exemplary graphical representation of the flow of information and decision making of the present invention.

FIG. 4 is an exemplary graphical representation of the iterative process in determining the Dynamic Sphere of Influence.

FIG. 5 is a graphical representation showing the Software flow of information from a User standpoint.

FIG. 6 is an exemplary graphical representation that depicts the results of the present invention's analysis of the relationship between several external variables and revenue.

DETAILED DESCRIPTION OF THE INVENTION

With respect to FIG. 1, system 100 of the present invention is utilized as follows: a query is sent via a User Interface 102 using the Graphical User Interface (GUI) module 104 for input. Relevant information from one or more of a plurality of databases 106a, 106b, 106c and 106d, containing one or more data strings, 107a, 107b, 107c, 107d, will be assessed and collected through a Data Ingestion Module 108. This information, along with information from the existing database 110 is sorted in the Indexing Engine 112 and forwarded to the Data Query Engine 114. The data is then sent to the Quantitative Analysis Method Module 120, specifically to the Data Input/Choose Analysis 122. Based on the analysis chosen, information is fed to the Discovery Modeling Engine 124 the Trending Modeling Engine 126 and Predictive Modeling Engine 128. The Discovery Modeling Engine 124, Trending Modeling Engine 126 and Predictive Modeling Engine 128 can request more data (new or updated) from the Data Input/Choose Analysis 122. Alternatively, data from the Discovery Modeling Engine 124 can be sent to Trending Modeling Engine 126, and to Predictive Modeling Engine 128 if complete analysis utilizing all Modeling Engines is desired. Data from the Modeling Engines 124, 126 and 128 may then go directly to Test Significance 130. If the result of Test Significance 130 is No, Data Input/Choose Analysis 122 is repeated. If the result of Test Significance 130 is Yes, information is fed into the Decision Engine 132, and results are may be forwarded to the Dashboard 134 for display, and/or to Actions Items 136 for additional analysis or to obtain additional required information. The information may then be graphically represented through the Visualization module 138, and fed through the GUI Output 140 back to the User Interface 102.

With respect to FIG. 2, the Modeling Engine System 200, is shown in detail. The Modeling Engine system comprises a Data Input/Choose Analysis module 122. Based on user selection, Data Input/Choose Analysis 122 transfers data to Discovery Math Modeling 124, Trending Math Modeling 126, or Predictive Math Modeling 128.

When Data is fed into Discovery Math Modeling 124, Pattern Statistical Engine 222 performs pattern recognition calculations. Analysis executed here may include existing pattern recognition math techniques, but not limited to descriptive statistics, correlation, time series, etc. If any there are no desired patterns within, or between the data at the Patterns of Interest module 224, the data is examined again, looping back to Data Input/Choose Analysis 122 for additional or updated data. If Pattern of Interest 224 is detected, information is forwarded to Trending Math Modeling 126 for next step of analysis, or can be sent to Test Significance 130.

When Data is fed into Trending Math Modeling 126, Trending Statistical Engine 242 performs comparative calculations. Analysis executed here may include existing comparative math techniques, but not limited to correlation, principle component, cluster, boot-strapping, etc. If any there are no desired relationships within, or between the data at the Data Relationship module 244, the data is examined again, looping back to Data Input/Choose Analysis 122 for additional or updated data. If Data Relationship 224 is detected, information is forwarded to Predictive Math Modeling 128 for next step of analysis, or can be sent to Test Significance 130.

When Data is fed into Predictive Math Modeling 128, Forecasting Statistical Engine 262 performs future projection calculations. Analysis executed here may include existing prediction math techniques, but not limited to regression, discriminate functions, etc. If any there are no predictive models established within, or between the data at the Data Forecasting module 264, the data is examined again, looping back to Data Input/Choose Analysis 122 for additional or updated data. If Data Forecasting 264 is established, information is forwarded to Test Significance 130.

With respect to FIG. 3, a graphical representation of the "Finish-Line Approach" system 300 of the present invention is exemplified. Taken Data Input from outside of system 300, and/or the Customer Defined KPI (Key Performance Indicator) (End Goal) 302 is selected. The KPI is used as a Benchmark/Filter for Data Analysis 304. The data set or sets are then entered into the Quantitative Analysis module 120 along with Upstream Measured Data A 306a, Upstream Measured Data B 306b, Upstream Measured Data C 306c, Upstream Measured Data N 306d. The output of the Quantitative Analysis Method 120 is then analyzed to determine if a Statistical Relationship 308 exists. If No, then More Data and Analysis Needed 310 is flagged and additional Upstream Measured Data 360a, 306b, 306c, 306d is required. If Yes, then Identified Data Influence on KPI is flagged and the Updated Data Test 314 is considered. Data Input from outside of system 300 can also be fed into Updated Data Test 314 for consideration. If the result of Updated Data Test 314 is Yes, More Data and Analysis 310 is flagged. If Updated Data Test is No, Data Identified to Drive KPI 318 is confirmed, and the output may be iteratively applied back through the Customer Defined KPI (End Goal) module 302 for continuous improvement, and/or sent as Data Output to outside of system 300.

With respect to FIG. 4, a graphical representation of the Sphere of Influence (SOI) Index system 400 is depicted. From Input Data outside of SOI Index System 300, and/or the user initially identifies Sphere Of Index (SOI) Relevant to a Business Function 402, that data is entered into Customer Defined KPI (End Goal) 302 within "Finish-Line Approach" system 300. If Data Identified to Drive KPI 318 is detected, the result is used to Define the Number of Influence Data in the SOI Index 404. The data is then analyzed to determine the Weighting of Individual Data in SOI Index 406. A check is made to determine if there Real-Time Update SOI 408 is needed. If Yes, the data is checked for Updated Data Test 314 in the "Finish-Line Approach" system 300. If No, SOI Index Snapshot 410 is created, and can be forwarded to optimize, modify and/or refine SOI Relevant to Business Function 402, and/or sent as Output Data to outside SOI Index System 300.

With respect to FIG. 5, Software User Execution system includes a User Login 502 and an Authentication Module 504. Upon authentication, the user may Select Data for Analysis 506. The system may query if the selected data is New Data 508. If the data is new, the user may choose a Data File/Type/Location 510, Upload/Parse Data for Database 514.

If the data is already resident in the database, either one, multiple or combinations of, Quantitative Analysis Method, Finish Line Method or Dynamic Sphere of Index (SOI), may be pursued. In the first, the Quantitative Analysis Method 120 performs Discovery, Trending and Predictive functions on the data. The results may then be sent to Graphical Output 526 for the user to view, and may be saved, transmitted, printed or deleted. The user may also exit the system through the User Logout 528.

Alternatively, separately, in concert or combination with, to the above data manipulation, may be sent to the Finish Line Method 300, where the user can define Key Performance Indicators (KPIs)/Benchmarks, test all relevant data, and identify the data are key drivers of the said KPIs/benchmarks. The results may then be sent to Graphical Output 526 for the user to view, and may be saved, transmitted, printed or deleted. The user may also exit the system through the User Logout 528.

Alternatively, separately, in concert or combination with, to the above data manipulation, may be sent to the Dynamic Sphere of Influence (SOI) Index, where the user can detect, select and customize a Sphere of Influence (SOI) Index that is relevant and complements a specific business goal(s). The results may then be sent to Graphical Output 526 for the user to view, and may be saved, transmitted, printed or deleted. The user may also exit the system through the User Logout 528.

If the Authentication 504 fails, the user may be prompted to a Sign Up/Password Retrieval module 530. If the user has an account does not wish to create a new account, they will be sent a Password Recovery Email 534 and returned to the User Login 502.

If the user wishes to sign up, they may do so and a Sign Up Confirmation Email 538 will be generated and sent to the user, who is then returned to the User Login 502.

With respect to FIG. 6, the Output GUI 140 of FIG. 1 may be represented in the manner of the Software Graphical User Interface system screen 600. Function Bar 610 contains multiple functions that may be selected through an input device, for example, a mouse, a pen, a touch screen or by voice command. One embodiment of the present invention includes a New/Open Analytics tab, a Custom Data tab, Standard Editing Functions, Benchmark Data Configuration, Standard/Favorite Analytic Scenarios, Share/Publish Report and Help Functions. Additional or alternative functions may be configured as necessary or appropriate for different embodiments. A Filter or Search by Keyword Box 612 allows a user to search for particular data, results or other elements of the database by text, keyword or other search strings. Both the Search and Filter function may be contextual, literal or employ Boolean arguments to generate results. Display Tabs 630 allow the user to select the type of analysis that he or she wishes to have displayed.

In one embodiment of the present invention a Trending Analysis tab shows the relationship between several plotted variables in a graphical output display. There are additional Discovery, Predictive and Dashboard tabs also shown. These tabs are exemplary and are not to be considered limiting.

Key Performance Indicators (KPIs)/Benchmarks variables selectable by user, shown as Select KPI Data 642. Relationship variables are shown as Select Test Data 644. In one embodiment of the present invention, Sales is chosen as KPI data, Media Car Loan, Consumer Confidence Index (CCI) and Web Traffic are chosen as Test Data. As with the display tabs above, these categories are exemplary and not to be considered limiting. Analysis Date Range 640 allows the user to identify the start and end date for the analysis to be performed.

In the graphical visualization 650, plots are displayed based on user selection of KPI and Test data. A Time Slider tab 652 is available to scroll chronologically through a display showing the effect of different test data over time against KPI data. A custom View Date range 654 option is also available to display results between a specific start and end date. The types charting presented, line plots, scatter, bar, etc., are exemplary and are not to be considered limiting.

Tables are available to show Discovery Results 660, Trending Results 662 and Predictive Results 664 corresponding to the types of analysis chosen based on Display Tab 630. Action Items 670 presents the recommended actions to be taken also based aon the corresponding analysis chosen with Display Tab 630.

While various embodiments of the disclosed system, software, and method have been described above, it should be understood that they have been presented by way of example only, and should not limit the claimed invention. Likewise, the various diagrams may depict an example architectural or other configuration for the disclosed system, software, and method. This is done to aid in understanding the features and functionality that can be included in the disclosed system, software, and method. The claimed invention is not restricted to the illustrated example architectures or configurations, rather the desired features can be implemented using a variety of alternative architectures and configurations. Indeed, it will be apparent to one of skill in the art how alternative functional, logical or physical partitioning and configurations can be implemented to implement the desired features of the disclosed system, software, and method. Also, a multitude of different constituent module names other than those depicted herein can be applied to the various partitions. Additionally, with regard to flow diagrams, operational descriptions and system or method claims, the order in which the steps are presented herein shall not mandate that various embodiments be implemented to perform the recited functionality in the same order unless the context dictates otherwise.

Although the disclosed system, software, and method is described above in terms of various exemplary embodiments and implementations, it should be understood that the various features, aspects and functionality described in one or more of the individual embodiments are not limited in their applicability to the particular embodiment with which they are described. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of providing a relationship between sets of data comprising:
    a) gathering a first data set with at least one first data string,
    b) gathering a second data set with at least one second data string,
    c) relating the at least one first data string to the at least one second data string with a quantitative value through pattern recognition algorithms,
    d) determining the relationship between the at least one first data string's ranking and the at least one second data string's ranking to a benchmarked data through comparative mathematical algorithms,
    e) constructing a predictive mathematical model of the relationship between the at least one first data string's and the at least one second data string's behavior against a benchmarked data through predictive mathematical algorithms,
    f) constructing a predictive model of the at least one first data string,
    g) constructing a graphical representation of the relationship between the at least one first data string and the at least one second data string's behavior against a benchmarked data; and,
    h) constructing a graphical representation of the predicted behavior of the at least one second data string related to changes to the at least one first data string; and
    i) displaying the graphical representation on a user interface.

2. The method of providing a relationship between sets of data according to claim 1 wherein the at least one first data set is marketing data.

3. The method of providing a relationship between sets of data according to claim 1 wherein the at least one first data set is public relations data.

4. The method of providing a relationship between sets of data according to claim 1 wherein the at least one first data set is advertising data.

5. A system for evaluating the relation between sets of data comprising:
    a) a first data set with at least one first data string,
    b) a second data set with at least one second data string,
    c) a means for relating the at least one first data string to the at least one second data string with a quantitative value through pattern recognition algorithms,
    d) a means for determining the relationship between the at least one first data string's ranking and the at least one second data string's ranking to a benchmarked data through comparative mathematical algorithms,
    e) a means for constructing a predictive mathematical model of the relationship between the at least one first data string's and the at least one second data string's behavior through predictive mathematical algorithms,
    f) a means for constructing a graphical representation of the relationship between the at least one first data string and the at least one second data string,
    g) a means for constructing a graphical representation of the predicted behavior of the at least one second data string related to changes to the at least one first data string; and
    h) a user interface for displaying the graphical representation.

6. The system for evaluating the relation between sets of data according to claim 5 wherein the system is presented on as a computer program.

7. The system for evaluating the relation between sets of data according to claim 5 wherein the system is presented on as software as a service.

8. The system for evaluating the relation between sets of data according to claim 5 wherein the at least one first data string is marketing data.

9. The system for evaluating the relation between sets of data according to claim 5 wherein the at least one first data string is public relations data.

10. The system for evaluating the relation between sets of data according to claim 5 wherein the at least one first data string is advertising data.

11. A system for providing an attribution of relevance to compiled data comprising:
    a) a means for gathering a plurality of data having significance for a defined customer,
    b) a means for compiling the data in an electronic database,
    c) a means for evaluating the value of each of the data in relation to each other, through pattern recognition to the defined customer in the electronic database,
    d) a means for defining a set of variables affected by the value of the significant data
    e) a means for assigning a ranking weighted value to the defined set of variables,
    f) a means for constructing a predictive model based on the defined set of variables,
    g) a means for generating at least one report graphically for the defined customer using the electronic database summarizing a plurality of the data to provide an indicator of a relationship between the plurality of data to the defined customer; and
    h) a user interface to display the at least one report.

12. The system for providing an attribution of relevance to compiled data of claim 11 wherein the compiled data is marketing data.

13. The system for providing an attribution of relevance to compiled data of claim 11 wherein the compiled data is public relations data.

14. The system for providing an attribution of relevance to compiled data of claim 11 wherein the compiled data is advertising data.

\* \* \* \* \*